July 6, 1954  E. J. CAULE  2,683,030
AUTOMATIC WEIGHING BALANCE
Filed March 2, 1953  3 Sheets-Sheet 1
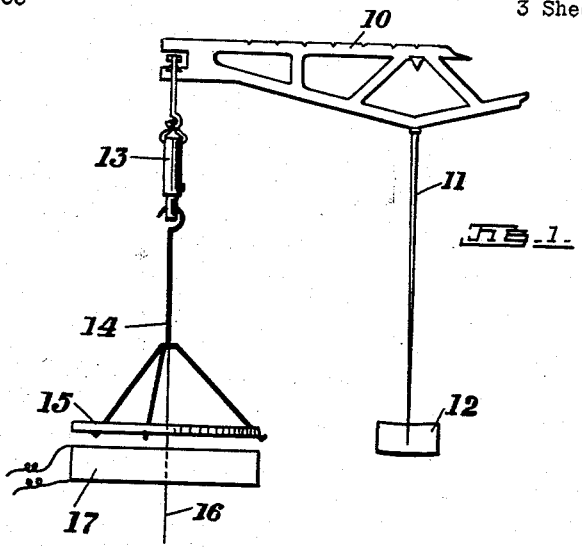
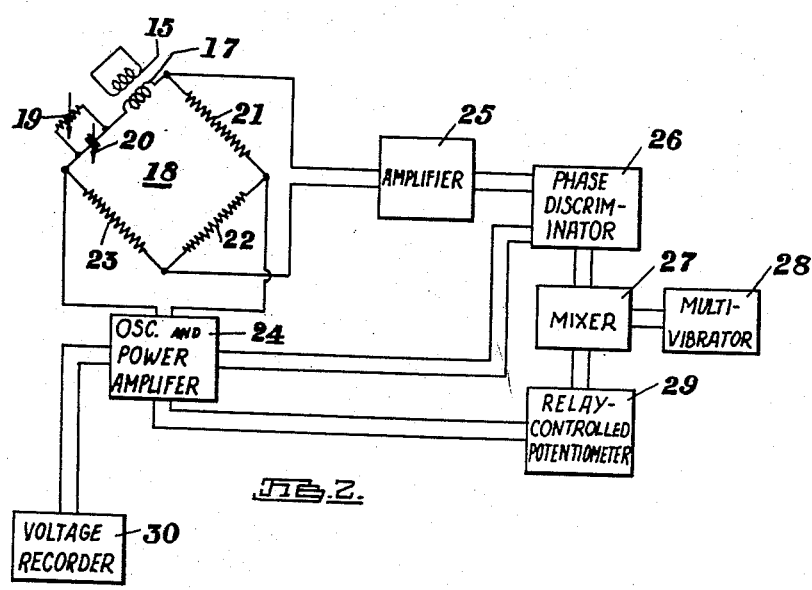
INVENTOR
ELMER J. CAULE
BY Smart & Biggar
ATTORNEYS

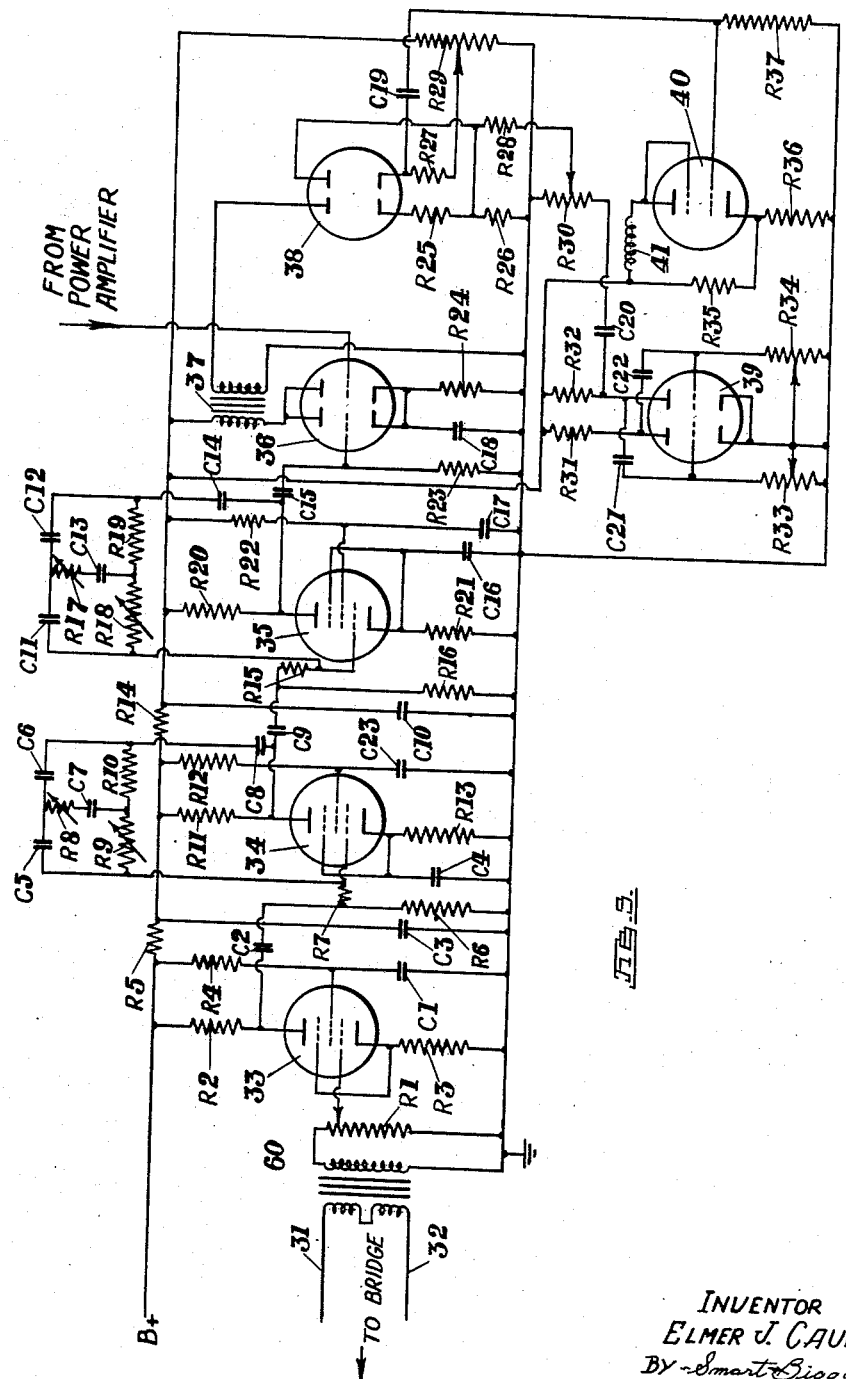

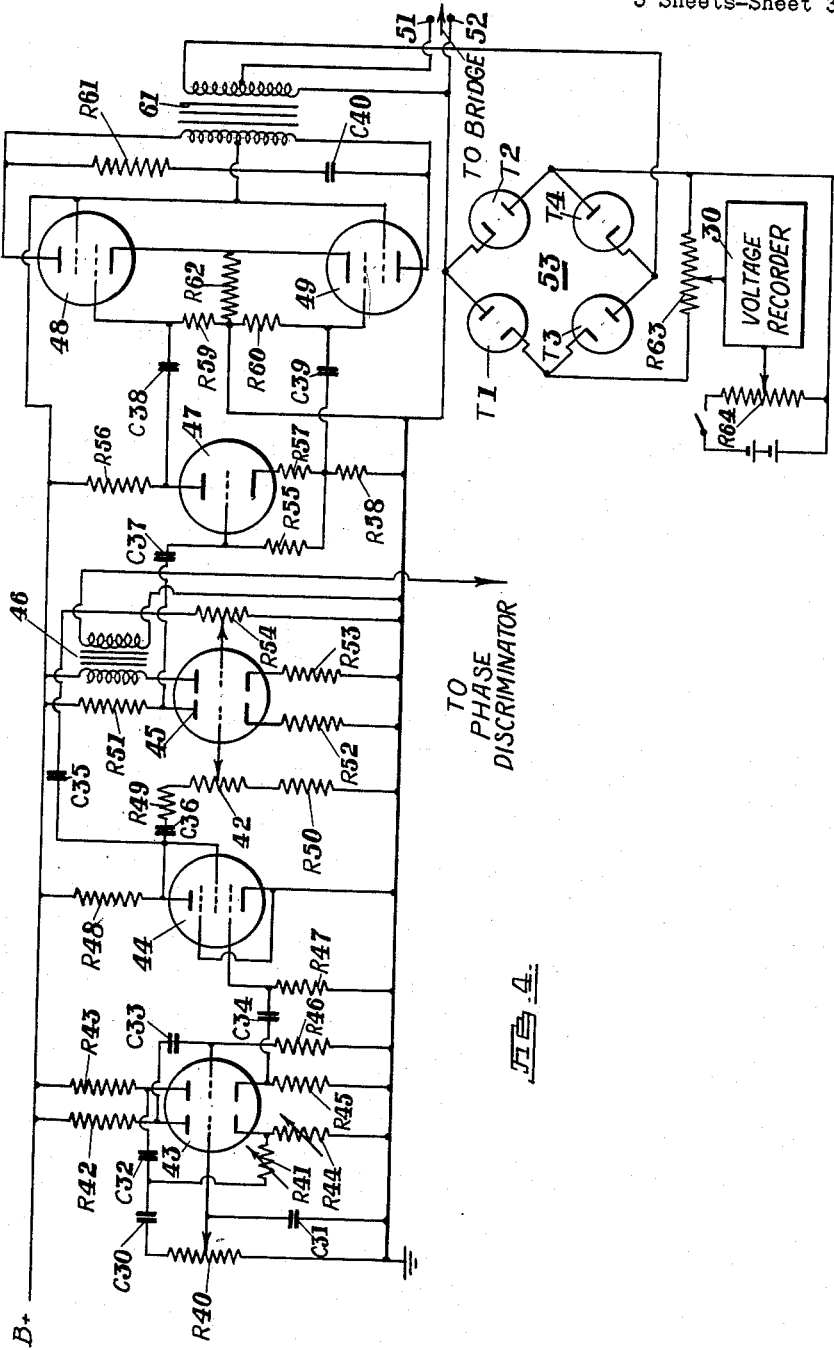

Patented July 6, 1954

2,683,030

UNITED STATES PATENT OFFICE 2,683,030

AUTOMATIC WEIGHING BALANCE

Elmer J. Caule, Ottawa, Ontario, Canada

Application March 2, 1953, Serial No. 339,691

4 Claims. (Cl. 265—70)

The invention relates to automatic weighing balances and concerns an adaptation of a conventional precision balance whereby it is made to correct to zero continuously and, if desired, provide a continuous recording of weight as a function of time.

There are many cases in which it is desirable to have a weighing balance which will automatically record small weight changes over such a long period of time, for example, several weeks, as may be the case in investigations in the metallurgical field. It has been difficult and very tedious to carry out these weighing operations manually, particularly in view of the precision required by most research problems. The present invention provides a weighing balance which is continuously adjusting to zero and which can make a record of changes of weight as a function of time.

An automatic weighing balance in accordance with the present invention comprises means including a short-circuited electrically conducting coil for counterbalancing the weight of the object to be weighed, a fixed electrically conducting coil separated from the short-circuited coil by a distance such that a substantial mutual inductance effect can exist between the two coils, an impedance bridge including the fixed coil in one of its arms, a phase discriminator for producing an output signal of which the strength is dependent on the phase relationship between its inputs, an oscillator for supplying a signal to the bridge and to one of the inputs of the discriminator, another input of the discriminator being supplied from the output signal of the bridge, a multivibrator, means for mixing the output of the discriminator with the output of the multivibrator thereby producing a periodic signal of which the strength varies according to the strength of the output signal of the bridge, and means controlled by the periodic signal for varying the strength of the signal supplied from the oscillator to the bridge.

In most cases it is desirable to have a recorder arranged to record the strength of the signal supplied from the oscillator to the impedance bridge so that a record of changes of weight as a function of time is obtained.

A preferred form of the means controlled by the periodic signal for varying the strength of the signal supplied from the oscillator to the impedance bridge is a stepping relay arranged to operate a potentiometer by steps. The stepping relay is connected to be operated by the combined outputs of the phase discriminator and the multivibrator, and the potentiometer is connected to control the strength of the signal supplied by the oscillator to the bridge. Preferably, the potentiometer is a multi-turn helical potentiometer.

The adaptation of a conventional weighing balance in accordance with the present invention is electronic, and no modification in the structure of the balance is required. There are no connections or wiring to be made to the swinging beam. Accordingly, there are no mechanical connections to lower the sensitivity of the balance. According to the invention, increases in weight (or decreases depending on the particular arrangement of the apparatus) are offset by increases (or decreases) in the repulsion between two coils carrying alternating current. One of the coils is fixed to the floor of the balance case and is fed current from an oscillator. The other coil is swung from the balance arm and is short-circuited. The two coils are separated from each other but are at such a distance that a substantial mutual inductance effect can exist between the two coils so that the current in the fixed coil induces current in the short circuited coil. It is this relation between the two coils which is used to restore the balance of the bridge after it has been disturbed by a change in weight of the object being weighed and which serves in obtaining a signal indicating a change in weight.

The electronic apparatus includes an oscillator, a power amplifier for furnishing alternating current to the fixed coil, and a balanced impedance bridge having the fixed coil in one of its arms. Any change in the relative distance between the two coils creates a small potential across the bridge, which is used to operate a mechanism to change the current through the fixed coil and hence the relative positions of the coils, thereby readjusting the balance. According to the invention, the electronic apparatus is arranged to provide the corrective force to the balance in small increments at short time intervals so that oscillation (hunting) of the balance is prevented.

The invention will be further described with reference to the attached drawings, in which Figure 1 shows part of a conventional weighing balance fitted with coils in accordance with the present invention;

Figure 2 is a block diagram of electronic apparatus in accordance with the present invention;

Figure 3 is a schematic diagram of the circuits of the amplifier, phase discriminator, multivibrator and mixer circuits which are shown in block form in Figure 2; and Figure 4 is a schematic diagram of the circuits for the oscillator, power amplifier, and the voltage recorder.

One side of the balance arm 10 of a conventional, three knife-edge, analytic balance is shown in Figure 1. Attached to the center of the balance arm 10 is a pointer 11 arranged to travel over a scale 12 in the usual manner. A counterweight 13 is suspended near the end of the balance arm 10 and from it is suspended a copper tripod 14 which supports a short-circuited coil 15. The copper tripod 14 is also arranged to support the object to be weighed by a platinum load support wire 16. Beneath the coil 15 is a coil 17 which may be fixed to the floor of the balance case.

The short-circuited coil 15 and the coil 17 are shown schematically in Figure 2 with the coil 17 connected in one of the arms of a bridge circuit 18. The coil 17 and a variable resistance 19 which is connected in parallel with a variable capacitor 20 form one arm of the bridge 18 while the remaining arms are formed by impedances 21, 22 and 23. An oscillator and power amplifier 24 are arranged to supply a signal to the bridge 18, and connections for the output signal from the bridge are made to an amplifier 25. A phase discriminator 26 has its input connected to the output of the amplifier 25 and to the oscillator and power amplifier 24. The output of the phase discriminator is supplied to a mixer 27 where it is mixed with the signal from a multivibrator 28. The output signal from the mixer 27 is connected to operate a relay controlled potentiometer 29 which is connected to control the power output from the oscillator and power amplifier 24. A voltage recorder 30 is connected to the power amplifier 24 to record changes in the signal level supplied to the bridge 18.

A detailed schematic diagram for the amplifier 25, the phase discriminator 26, the mixer 27 and the multivibrator 28 is shown in Figure 3. The particular circuits shown in Figure 3 are conventional ones and, therefore, they will not be described in detail. Connections from the bridge 18 to the amplifier 25 (Figure 2) are made by leads 31 and 32 (Figure 3). The circuit of the amplifier includes three vacuum tubes 33, 34 and 35 (Figure 3) connected to supply an amplified signal to the phase discriminator circuit which includes the vacuum tube 36 of which one control grid is supplied with a signal from the anode of the vacuum tube 35 while the other control grid is supplied with a signal from the power amplifier. The resultant signal from the phase discriminator is supplied through a transformer 37 to one of the anodes of a vacuum tube 38 which is a part of the mixer circuit. The circuit of the multivibrator includes a vacuum tube 39 which is arranged to supply a signal to the other anode of the vacuum tube 38. The mixed signal from the vacuum tube 38 is used to control a vacuum tube 40 having the operating coil 41 of a relay (not shown) connected in its anode circuit. The relay is connected to operate a ratchet relay (not shown) which in turn operates a helical multi-turn potentiometer 42 (Figure 4) by steps in accordance with the pulsed output from the mixer circuit.

In the circuit shown in Figure 4, a vacuum tube 43 is arranged as an oscillator of which the output is amplified by a circuit including a vacuum tube 44. The amplified output of the oscillator circuit is supplied by the multi-turn potentiometer 42 to the control grid of a vacuum tube 45 which acts as a further amplifier to supply signal through a transformer 46 to the phase discriminator 26 and to the vacuum tubes 47, 48 and 49. The vacuum tubes 48 and 49 act as a power amplifier to supply signal through a transformer 61 to the terminals 51 and 52 which are connected to the bridge circuit 18 (Figure 2). The voltage recorder 30 is connected to the power amplifier through a rectifier circuit 53.

While the design of the particular circuit shown in Figures 3 and 4 is conventional, the following list of components and their values is supplied as an example to aid in the construction of an apparatus in accordance with the invention:

| Component | Value |
|---|---|
| R1, R8, R9, R17, R18 | 250K ohms. |
| R2, R5, R6, R11, R14, R16, R20, R23, R25, R26, R27, R28, R51 | 100K ohms. |
| R3, R13 | 1.8K ohms. |
| R4, R7, R10, R12, R15, R19, R22, R46, R55 | 470K ohms. |
| R24, R50 | 1.5K ohms. |
| R29, R47, R54, R59, R60 | 220K ohms. |
| R30 | 1M ohms. |
| R31, R32, R40 | 150K ohms. |
| R33, R34 | 5M ohms. |
| R35, R41, R44 | 5K ohms. |
| R36 | 560 ohms. |
| R37 | 0.5M ohms. |
| R42, R43, R56, R58 | 47K ohms. |
| R45 | 680 ohms. |
| R48 | 33K ohms. |
| R49 | 470 ohms. |
| R52, R53 | 2.2K ohms. |
| R57 | 3.3K ohms. |
| R61 | 15K ohms. |
| R62 | 220 ohms. |
| R63, R64 | 50K ohms. |
| 19 (Figure 2) | 71.7 ohms. |
| 21 (Figure 2) | 6.05 ohms. |
| 22 (Figure 2) | 16.0 ohms. |
| 23 (Figure 2) | 29.0 ohms. |
| C1, C17, C23 | 0.1 mfd. |
| C2, C8, C14 | 0.01 mfd. |
| C3, C10 | 20 mfd. |
| C4, C16 | 50 mfd. |
| C5, C6, C9, C11, C12, C15, C37 | 0.001 mfd. |
| C7, C13, C30 | 0.002 mfd. |
| C18, C32 | 10 mfd. |
| C19, C20 | 1.0 mfd. |
| C21, C22 | 2.0 mfd. |
| C31 | 0.006 mfd. |
| C33 | 0.05 mfd. |
| C34, C35, C36 | 0.5 mfd. |
| C38, C39, C40 | 0.02 mfd. |
| 20 (Figure 2) | 11.277 mfd. |
| Tubes: 33, 34, 35, 44 | Type 6AU6. |
| 36, 39, 43, 45 | Type 12AU7. |
| 38, T1, T2, T3, T4 | Type 6AL5. |
| 40, 48, 49 | Type 6AQ5. |
| 47 | Type 6C4. |

Transformer 60—ratio of 1:20; input imped./output imped. of 200/80,000.

Transformers 37 and 46—ratio of 1:3; input imped./output imped. of 10,000/90,000.

Transformer 61—ratio of 25:1; input imped./output imped. to bridge of 10,000:6.4; input imped./output imped. to recorder of 10,000:10.

Relay coil 41—110 v. D. C. to operate on 50 ma. approx.

Coil 17 consists of formex-coated copper wire wound on a Pyrex glass ring as former. The ring is 4 inches in diameter and ¾ inch wide.

There are 7 layers of wire, each of about 25 turns.

Coil 15 is of the same wire and diameter as coil 17 but has no glass former. It has 4 layers of about 10 turns each, with the two ends of the coil soldered together.

Recorder 30—Leeds and Northrup Speedomax (trade name) D. C. voltage recorder.

The operation of the apparatus will be described in connection with a typical use such as following the increase in weight of a specimen of stainless steel heated in air for a period of several weeks. The steel is suspended by the load support wire 16 (Figure 1), which should be of platinum, and arranged to pass through the coils 15 and 16 into a furnace beneath the balance case. Balance is restored by adding weights to the other arm of the balance and power is supplied to the coil 17 so that the recorder 30 is operating at the beginning of its range and weights are then removed to restore balance. The variable capacitor 20 and the variable resistor 19 (Figure 2) are adjusted to balance the bridge with aid of a cathode ray oscilloscope to detect the point at which the signal output of the bridge is at a minimum. In detecting this minimum use should be made of the selective amplifier 25 to eliminate undesirable harmonics. The size of the pulse delivered by the multivibrator 23 (Figure 2) is then adjusted so that the relay-controlled potentiometer 29 (Figure 2), of which the operating coil 41 is shown in Figure 3, is just on the point of being actuated.

If, after these adjustments have been made, the steel gains in weight thereby bringing the short-circuited coil 15 closer to the coil 17 and causing the bridge 18 (Figure 2) to become unbalanced, an "error" signal is sent to the phase discriminator circuit 26. The phase discriminator circuit 26 "mixes" the error signal with the "reference" signal derived from the power amplifier 24. The mixed signals produce a resultant signal equal in amplitude to their sum, the sum being dependent on the phase relationship of the error signal to the reference signal. There is a difference in phase of 180° between an error signal resulting from approach of the two coils 15 and 17 to each other and that resulting from their recession. The phase of the reference signal is so arranged that for approach of the two coils 15 and 17 the "mixed" voltage is greater than the voltage when the bridge is in balance. The mixed voltage is rectified at the vacuum tube 38 (Figure 3) to produce a direct current voltage which increases with approach and decreases with recession of the coils 15 and 17. To this voltage is applied the pulses from the multivibrator 28, the amplitude of which was adjusted as described above. If the error signal is great enough, that is, if the balance is out of equilibrium by more than a definite amount, the sum of the direct current voltage and each pulse from the multivibrator 28 causes anode current of the tube 40 (Figure 3) to increase momentarily thereby increasing the current through the operating coil 41 of the relay which is arranged to energize the ratchet relay and so operate the potentiometer 42 (Figure 4). The multiturn helical potentiometer 42 (Figure 4) is on the shaft of the gear of the ratchet relay (not shown) so that power supplied to the bridge 18 (and thus to the coil 17) is increased by a definite amount which depends on the number of teeth on the gear of the ratchet relay and the value of the resistance of the multiturn helical potentiometer 42 and the resistances in series with it. The increased power in the coil 17 acts to move the coil 15 away from the coil 17 and to offset the weight increase in the stainless steel. At the same time, the recorder 30 (Figure 2) moves to indicate the new value of current in the coil 17.

It has been found satisfactory to set the multivibrator 28 (Figure 2) to give positive pulses every 6 seconds. Then, with 50 teeth to the gear of the ratchet relay attached to the multiturn helical potentiometer 42, and 10 turns possible to the latter, the increments of restoring force are so gentle that hunting is prevented. The balance used may have the common form of magnetic damping.

The record produced by the recorder 30 is a chart of voltage as a function of time. It has been noted that weight increases are proportional to the squares of the corresponding voltage increases so that a graph of weight as a function of time is easily obtained.

The operation described above is the sequence of events that occurs when there is an increase in weight. It is obvious that by placing the object to be weighed on the opposite arm of the balance to that to which the coil 15 is attached, the apparatus could be made to operate to record decreases in weight. It is also obvious that with changes, including the provision of two relay and multiturn helical potentiometer systems, the instrument could record decreases and increases of weight in the same sequences of weight changes.

The balance shown in Figure 1 is an adaptation of a conventional analytical balance of the type possessing three knife edges. The adaptation could equally as well have been made to any other kind of balance, as for example, a torsion or a spring balance.

The frequency of the oscillator and power amplifier 24 (Figure 2) is 670 cycles in the example described but other frequencies may be used. The frequency of 670 cycles was selected to avoid power line harmonics or other signals which might influence the apparatus.

What I claim as my invention is:

1. An automatic weighing balance comprising a support for an object to be weighed, means including a short-circuited electrically conducting coil for counterbalancing the weight of said object, a fixed electrically conducting coil separated from the short-circuited coil by a distance such that a substantial mutual inductance effect can exist between the two coils, an impedance bridge including said fixed coil in one of its arms, a phase discriminator for producing an output signal of which the strength is dependent on the phase relationship between its inputs, an oscillator for supplying a signal to said bridge and to one of the inputs of said discriminator, another input of said discriminator being supplied from the output signal of said bridge, a multivibrator, means for mixing the output of said discriminator with the output of said multivibrator thereby producing a periodic signal of which the strength varies according to the strength of the output signal of said bridge, means controlled by said periodic signal for varying the strength of said signal supplied from said oscillator to said bridge, and means for indicating the strength of the signal supplied from the oscillator to the impedance bridge.

2. The automatic weighing balance claimed in claim 1, in which the indicating means is a recorder adapted to record voltage as a function of time.

3. The automatic weighing balance claimed in claim 1 in which the means controlled by the periodic signal for varying the strength of the signal supplied from the oscillator to the impedance bridge comprises a stepping relay and a potentiometer arranged to be operated by steps by said relay, said stepping relay being connected to be operated by the mixed output signals of the phase discriminator and of the multivibrator, and said potentiometer being connected to control the strength of the signal supplied by said oscillator to said bridge.

4. The automatic weighing apparatus claimed in claim 3 in which the potentiometer is a multi-turn potentiometer.

References Cited in the file of this patent

UNITED STATES PATENTS

| Number | Name | Date |
|---|---|---|
| 2,081,367 | Nicolson | May 25, 1937 |
| 2,602,660 | Shannon | July 8, 1952 |
| 2,631,027 | Payne | Mar. 10, 1953 |